US008590046B2

(12) United States Patent
Baikalov et al.

(10) Patent No.: US 8,590,046 B2
(45) Date of Patent: Nov. 19, 2013

(54) LOGIN INITIATED SCANNING OF COMPUTING DEVICES

(75) Inventors: Igor A. Baikalov, Thousand Oaks, CA (US); Craig Froelich, Thousand Oaks, CA (US); Craig Kirby, Burbank, CA (US); Cris T. Paltenghe, Spirit Lake, ID (US); Ravi Pritmani, Irving, TX (US)

(73) Assignee: Bank of America Corporation, Charlotte, NC (US)

( * ) Notice: Subject to any disclaimer, the term of this patent is extended or adjusted under 35 U.S.C. 154(b) by 356 days.

(21) Appl. No.: 12/845,511

(22) Filed: Jul. 28, 2010

(65) Prior Publication Data

US 2012/0030757 A1 Feb. 2, 2012

(51) Int. Cl.
*G06F 11/00* (2006.01)
*G06F 15/173* (2006.01)
*G06F 15/177* (2006.01)

(52) U.S. Cl.
USPC .......... 726/25; 726/22; 726/23; 726/24; 709/222; 709/223; 709/224

(58) Field of Classification Search
USPC ............... 726/22–25; 709/222–224
See application file for complete search history.

(56) References Cited

U.S. PATENT DOCUMENTS

| | | | |
|---|---|---|---|
| 6,873,429 B2 * | 3/2005 | Matsuura | 358/1.15 |
| 7,328,454 B2 | 2/2008 | Strickland et al. | |
| 7,690,038 B1 * | 3/2010 | Ko | 726/24 |
| 8,429,274 B2 * | 4/2013 | Malkin | 709/223 |
| 2003/0212779 A1 * | 11/2003 | Boyter et al. | 709/223 |
| 2004/0250116 A1 * | 12/2004 | Strickland et al. | 713/201 |
| 2005/0097199 A1 * | 5/2005 | Woodard et al. | 709/223 |
| 2007/0118567 A1 * | 5/2007 | Isokawa | 707/200 |
| 2007/0271363 A1 * | 11/2007 | Ross et al. | 709/223 |
| 2009/0235359 A1 * | 9/2009 | Abdulhayoglu et al. | 726/25 |
| 2009/0287803 A1 * | 11/2009 | McQuillan et al. | 709/222 |
| 2012/0159631 A1 * | 6/2012 | Niemela et al. | 726/24 |

FOREIGN PATENT DOCUMENTS

WO WO 2006/024021 A2 3/2006

OTHER PUBLICATIONS

Fast Detection of Scanning Worm Infections, Stuart E. Schechter et al, pp. 59-81, Springer-Verlag, 2004.*

* cited by examiner

*Primary Examiner* — Philip Chea
*Assistant Examiner* — Shanto M Abedin
(74) *Attorney, Agent, or Firm* — Michael A. Springs; Moore & Van Allen PLLC; James C. Edwards

(57) ABSTRACT

Embodiments of the invention relate to systems, methods, and computer program products for login initiated remote scanning of computer devices. The present invention detects login to the network via access management systems. The login data provides information that identifies the device so that the device can be checked against a scan database to determine if and when a previous scan occurred. Based on the findings in the scan database determinations are made as to whether to perform a scan. Additionally, the level of scanning can be determined based on previous scan dates and previous scan results, which may dictate customized scanning. In addition, the priority of the impending scan may be dictated by previous scan dates and results. Further embodiments provide for assessing risk, such as risk scoring or the like, concurrently or in near-real-time with the completion of the scan so that alerts may be communicated.

29 Claims, 7 Drawing Sheets

LOGIN INITIATED SCANNING OF COMPUTING DEVICES

FIELD

In general, embodiments of the invention relate to methods, systems, apparatus and computer program products for scanning computing devices for information and, more particularly, for user login initiated scanning of computing devices for information, such as compliance and risk information.

BACKGROUND

Conventionally, two basic strategies exist for scanning computer devices for compliance and risk information. The first method is referred to herein as client-based and the second method is referred to herein as client-less. Client-based scanning methods require that a client (i.e., a computer application) be installed on each target device (i.e., the device being scanned), with the client running as a process. Once the process runs the requisite checks, the client communicates with a networked central collection point to report the results of the scan. Client-less scanning methods are executed on a device other than the target device (for example, scanning is executed at a server) and perform their checks by either port scanning, querying of public network interfaces or, with the proper user credentials, querying the target device. Each of the two methods provide for distinct advantages and disadvantages.

From the client-based scanning advantages perspective, the scan operation runs when the target device is running, this insures that the scan will occur. In addition, once the target device is connected to the network, the results of the scan are communicated, insuring that scan results are properly recorded. Moreover, since the method uses local processing resources at the target level, the processing load is spread across all of the target devices, thus eliminating the need to incorporate large processing-intensive scanning devices a the server level. However, from the disadvantages perspective, client-based scanning is limited because if a target device does not have the client installed, the target device goes undetected. Additionally, in many instances, if the client is not running when the target device is in communication with the network, the target device goes undetected. Such occurrences are prone to occur, in light of the fact that such scanning clients can be identified and disabled by the user. In addition, client-based scanning systems do not perform network discovery of new computing devices, and therefore the systems are unaware of new devices or subnets requiring scanning. Moreover, over time, clients require periodical update/revision, in the client-based system such updating requires that client be capable of update and, if capable, that the target devices be connected to the network while the client is running in order for the update to occur.

Client-less scanning benefits in that network discovery can be readily performed to identify new computing devices not previously seen or scanned. In addition, client-less scanning does not require installation on the target device, and therefore issues related to improper installation or failure to install are averted. In the same regard, since client-less scanning does not require a running process on the target device, client-less scanning is less susceptible to being disabled by the target user. Additionally, since the scanning process is executed centrally, client-less scanning can be updated and revised centrally, insuring that all scans going forward implement the same revision of the application. However, client-less scanning also includes numerous disadvantages. For example, the target device must be connected to the network when the scan is being executed, or, if the target device is unconnected, it will go undetected. In addition, in many instances in which information retrieval is restricted to port scanning, the information that is retrieved may be limited in scope. Additionally, enterprise scanning may be suspended during "black-out" periods and any target device that connects to the network during that time period goes undetected. Moreover, such a client-less system requires large processor-intensive scanning devices to be distributed geographically across the network to accommodate the scanning process.

Therefore, a need exists to develop a computing device scanning process that combines the benefits of the client-based and client-less scanning procedures, while addressing the disadvantages of the client-based and client-less computing device scanning procedures. Specifically, the desired system should eliminate the need to install clients/applications on the target device, thereby eliminating the possibility of devices going undetected and target users disabling the client. The desired system should know when a target device is connected to the network and scan at the most opportune time. In addition, the desired system should not be limited to one means of retrieving information from target devices, but rather allow for multiple means of retrieval. Additionally, the desired system should be capable of network discovery to insure that newly added target devices are properly identified and scanned. Moreover, the desired system should detect devices that come online during a "black-out" period, when the enterprise-wide scanning is suspended, and to scan only the identified device to prevent enterprise-wide impact. Additionally, the desired system should provide identification of incomplete scanning of a target device, so as to insure that re-scanning occurs and identification of target devices that are high-risk due to previous scan results.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for login initiated remote scanning of computer devices. The remote nature of the scanning provides for a client-less system, which characteristically does not require installation of software of the devices desired to scanned (referred to herein as the "target devices"). Moreover, since no software/client is running on the target device, the user of the target device is unable to disable or otherwise prohibit the scan from occurring.

The systems, apparatus, methods, and computer program products of the present invention detects login, or login attempts, to the network via existing access management systems, such as Active Directory®, Virtual Private Network (VPN) or the like. The login data provides information that identifies the device so that the device can be checked against a scan database to determine if and when the previous scan occurred. Based on the findings in the scan database determinations are made whether to perform a scan. In additional embodiments of the present invention, a level of scanning can be determined based on previous scan dates and/or scan results, which may dictate more or less scanning. In addition, dates of last-in-time scans and/or scan results may dictate the priority of the impending scan; i.e., devices that have not been scanned within a predetermined period or that have been identified as high-risk may be scanned before other devices are scanned.

Additionally, embodiments of the present invention provide for the remote scanning operation to be performed by port scanning methods, by querying of public network interfaces, such as NetBIOS or by authenticated queries, in instances in which the devices credentials are known to the scanning system. Additionally, third party scanning systems can be employed to perform the scan procedure or a portion of the scan procedure, such as vulnerability scanning or the like. Utilizing scanning devices, which are deployed in a distributable fashion, allows for the increase of scanning devices to be employed to meet the needs of the enterprise as more target devices are added. Additionally, the scanning devices are in communication with a central scan system to coordinate efficient scanning and transfer of results.

In addition, embodiments provide for risk assessments to be performed concurrently or in near-real-time to the completion of the scan. The risk assessments may take the form of risk scores or the like. By providing for near-real-time risk assessment of targeted devices, the invention provides for risk alerts to be communicated to designated parties for further risk assessment and, if deemed appropriate, corrective actions, such as disabling a device or specifics functions/ applications on the device, executed in near-real-time.

A method for scanning a computing device provides for first embodiments of the invention. The method includes receiving, from one of a plurality of network access control services, login event information associated with a computing device attempting to log in to a network. The method additionally includes determining, via a computing device processor, if scanning of the computing device is required based on the login event information. The method further includes initiating, via a computing device processor, a remote scan of the computing device based on the determination that the computing device requires scanning.

In specific embodiments, the method additionally includes assessing, in near-real time to the completion of the remote scan, results of the scan. In such embodiments, assessing may further include determining, via a computing device processor, at least one scan score for the computing device based at least in part on the results of the scan. Additionally, such embodiments may include generating and initiating communication of, via computing device processor, a scan alert that notifies predetermined parties of the results of the scan.

In further specific embodiments of the method, receiving further includes receiving, from the one of a plurality of network access control services, the login event information, wherein the login event is one of a successful login event or a failed login event.

In yet other specific embodiments of the method, determining further includes determining, via the computing device processor, if the computing device has been previously scanned. In such embodiments of the method, determining may include comparing, via the computing device processor, a host name, included in the login event information, to a list of previously scanned host names. Additionally, in such embodiments of the method, initiating further includes initiating, via the computing device processor, the remote scan if the determination is made that the computing device has not previously been scanned.

Moreover, in further embodiments of the method, determining further includes identifying, via the computing device processor, a scan date of a last-in-time scan for the computing device and determining if the scan date is within a predetermined required scan period. In such embodiments of the method, identifying further comprises comparing, via the computing device processor, a host name, included in the login event information to a list that associates previously scanned host names with respective scan date. Additionally, in such embodiments, initiating further includes initiating, via the computing device processor, the remote scan if the scan date of the last-in-time scan for the computing is determined to be outside of the predetermined required scan period.

In additional specific embodiments of the method, determining further includes determining a level of scanning required for the computing device based on the login information. In such embodiments of the method, determining further includes determining, via the computing device processor, if the computing device has been previously scanned within a predetermined required scan period. In addition, initiating further includes initiating, via the computing device processor, a full remote scan if the determination is made that the computing device has not scanned within the predetermined required scan period or initiating one of a partial remote scan or no scan if the determination is made that the computing device has been scanned within the predetermined required scan period.

In yet further specific embodiments of the method, determining further includes determining, via the computing device processor, results of one or more previous scans of the computing device. In such embodiments, initiating further includes initiating, via the computing device, a customized remote scan based on the results of the one or more previous scans of the computing device.

In still further specific embodiments the method includes determining, via a computing device, a priority for initiating the scan of the computing device. In such embodiments, initiating further includes initiating, via a computing device processor, the remote scan based on the determined priority. In related embodiments of the method, determining the priority further includes determining, via the computing device, the priority for initiating the scan based at least on one of date of a last-in-time scan or results of one or more previous scans. In further related embodiments of the method, initiating further includes queuing, via a computing device processor, the remote scan in one of a high-priority queue if the priority is determined to be of a predetermined high-priority level or a low-priority queue if the priority is determined to be less than the high-priority level.

In yet further specific embodiments the method includes identifying, via a computing device processor, a previously unidentified subnet within the network based on an Internet Protocol (IP) address included in the login event information. In related embodiments the method includes generating and initiating communication of, via a computing device processor, a sub-net alert that notifies predetermined parties of the subnet.

An apparatus for scanning a computing device provides for second embodiments of the invention. The apparatus includes a computing platform including a memory and at least one processor. The apparatus additionally includes a scan database stored in the memory, accessible via the processor and configured to store a historical scan data. Additionally, the apparatus includes a login scan application stored in the memory and executable by the processor. The login scan application includes a scan determination routine configured to receive, from one of a plurality of network access control services, login event information associated with a computing device attempting to log in to a network. The scan determination routine is additionally configured to determine if scanning of the computing device is required based on the login event information, the historical scan data and predetermined scan criteria. The login scan application also includes a scan initiation routine configured to initiate a remote scan of the computing device based on the determination that the computing device requires scanning.

In further embodiments of the apparatus, the login scan application further includes a scan assessment routine configured to assess, in near-real time to the completion of the remote scan, scan results of the remote scan. In such embodiments, the scan assessment routine may be further configured to determine at least one scan score for the computing device based at least in part on the scan results of the remote scan. In additional related embodiment of the apparatus, the login scan application further includes a scan alert routine configured to generate and initiate communication of a scan alert that notifies predetermined parties of the scan results.

In specific embodiments of the apparatus, the scan determination routine is further configured to receive, from the one of a plurality of network access control services, the login event information, wherein the login event is one of a successful login event or a failed login event.

In other specific embodiments of the apparatus, the scan determination routine is further configured to determine if the computing device has been previously scanned by comparing the host name, included in the login event information, to the historical data in the scan database. In such embodiments, the predetermined scan criteria includes criteria to initiate the remote scan if a determination is made that the computing device has not previously been scanned. Further, in such embodiments, the scan initiation routine is further configured to initiate the remote scan of the computing device if the determination is made that the computing device has not previously been scanned.

In still further specific embodiments of the apparatus, the scan determination routine is further configured to identify a scan date of a last-in-time scan for the computing device by comparing a host name, included in the login event information, to a list in the historical scan information that associates previously scanned host names with respective scan date. In such embodiments, the scan determination routine is further configured to determine if the scan date is within a predetermined required scan period. Additionally, in such embodiments, the predetermined scan criteria includes criteria to initiate the remote scan if a determination is made that a scan date of the last-in-time scan for the computing device is outside of a predetermined required scan period. Moreover, in such embodiments, the scan initiation routine is further configured to initiate the remote scan of the computing device if the scan date of the last-in-time scan for the computing device is outside of the predetermined required scan period.

In yet other specific embodiments of the apparatus, the scan determination routine is further configured to determine a level of scanning required for the computing device based on the login information, the historical scan data and the predetermined scan criteria. In such embodiments, the predetermined scan criteria includes criteria to initiate a full remote scan if a determination is made that computing device has not been full scanned within a first predetermined required scan period and criteria to initiate a partial scan if a determination is made that the computing device has not been partial scanned within a second predetermined required scan period and criteria to not initiate a scan if a determination is made that a full scan has occurred within the first predetermined required scan period and that a partial scan has occurred within the second predetermined required scan period. In such embodiments, the scan initiation routine is further configured to initiate the full remote scan if the determination is made that the computing device has not been full scanned within the first predetermined required scan period or to initiate a partial scan if the determination is made that the computing device has not been partial scanned within the second predetermined required scan period.

Moreover, in additional specific embodiments of the apparatus, the scan criteria includes criteria associated with scan results and the scan determination routine is further configured to determine the level of scanning required for the computing device based on the login information, the historical scan data and the predetermined scan criteria associated with the scan results. In such embodiments, the scan initiation routine is further configured to initiate a customized remote scan based on the results of the one or more previous scans of the computing device.

In other specific embodiments of the apparatus, the scan determination routine is further configured to determine a priority for initiating the scan of the computing device. In such embodiments, the scan initiation routine is further configured to initiate the remote scan based on the determined priority. Additionally, in such embodiments, the scan determination routine is further configured to determine the priority for initiating the scan based at least on one of date of a last-in-time scan or results of one or more previous scans.

In other specific embodiments the apparatus includes a security event management application is further configured to identify a previously unidentified subnet within the network based on an Internet Protocol (IP) address included in the login event information. In such embodiments, the apparatus may further include a subnet alert application stored in the memory, executable by the processor and configured to generate and initiate communication of a sub-net alert that notifies predetermined parties of the subnet.

A computer program product that includes a non-transitory computer-readable medium defines third embodiments of the invention. The computer-readable medium includes a first set of codes for causing a computer to receive, from one of a plurality of network access control services, login event information associated with a computing device attempting to log in to a network. The computer-readable medium additionally includes a second set of codes for causing a computer to determine if scanning of the computing device is required based on the login event information. In addition, the computer-readable medium includes a third set of codes for causing a computer to initiate a remote scan of the computing device based on the determination that the computing device requires scanning.

Thus, further details are provided below for systems, apparatus, methods and computer program products for login initiated remote scanning of computer devices. The present invention detects login, or login attempts, to the network via existing access management systems. The login data provides information that identifies the device so that the device can be checked against a scan database to determine if and when the previous scan occurred. Based on the findings in the scan database a determination is made to whether to perform a scan. Additionally, the level of scanning can be based on previous scan dates and previous scan results, which may dictate customized scanning. In addition, dates of last-in-time scans and/or scan results may dictate the priority of the impending scan. Further embodiments provide for assessing risk, such as risk scoring or the like, concurrently or in nearreal-time with the completion of the scan so that alerts may be communicated to notify designated parties for the purpose of instituting corrective actions, such as disabling applications or devices, proximate in time to the scan process.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
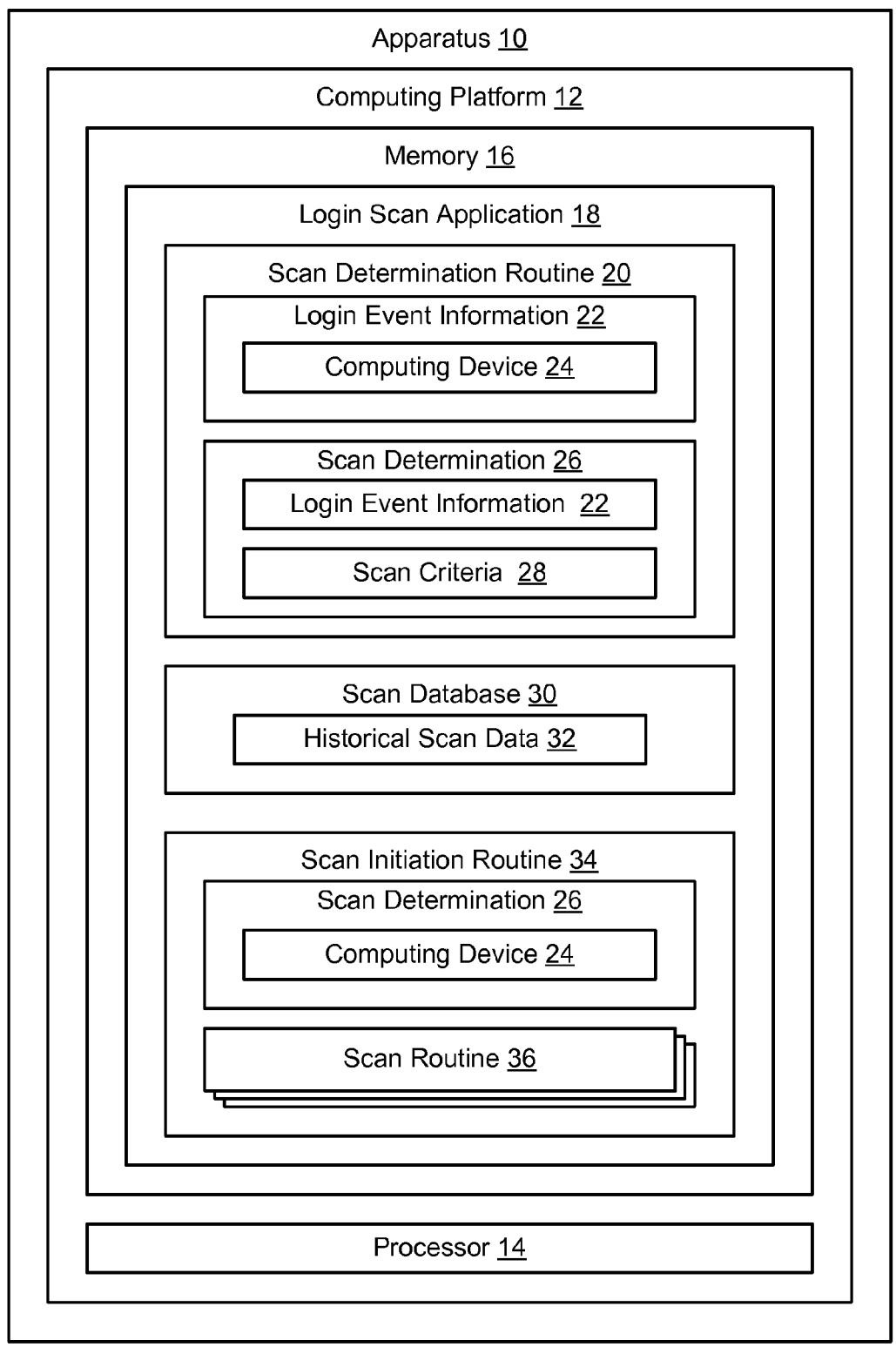
Figure 2:
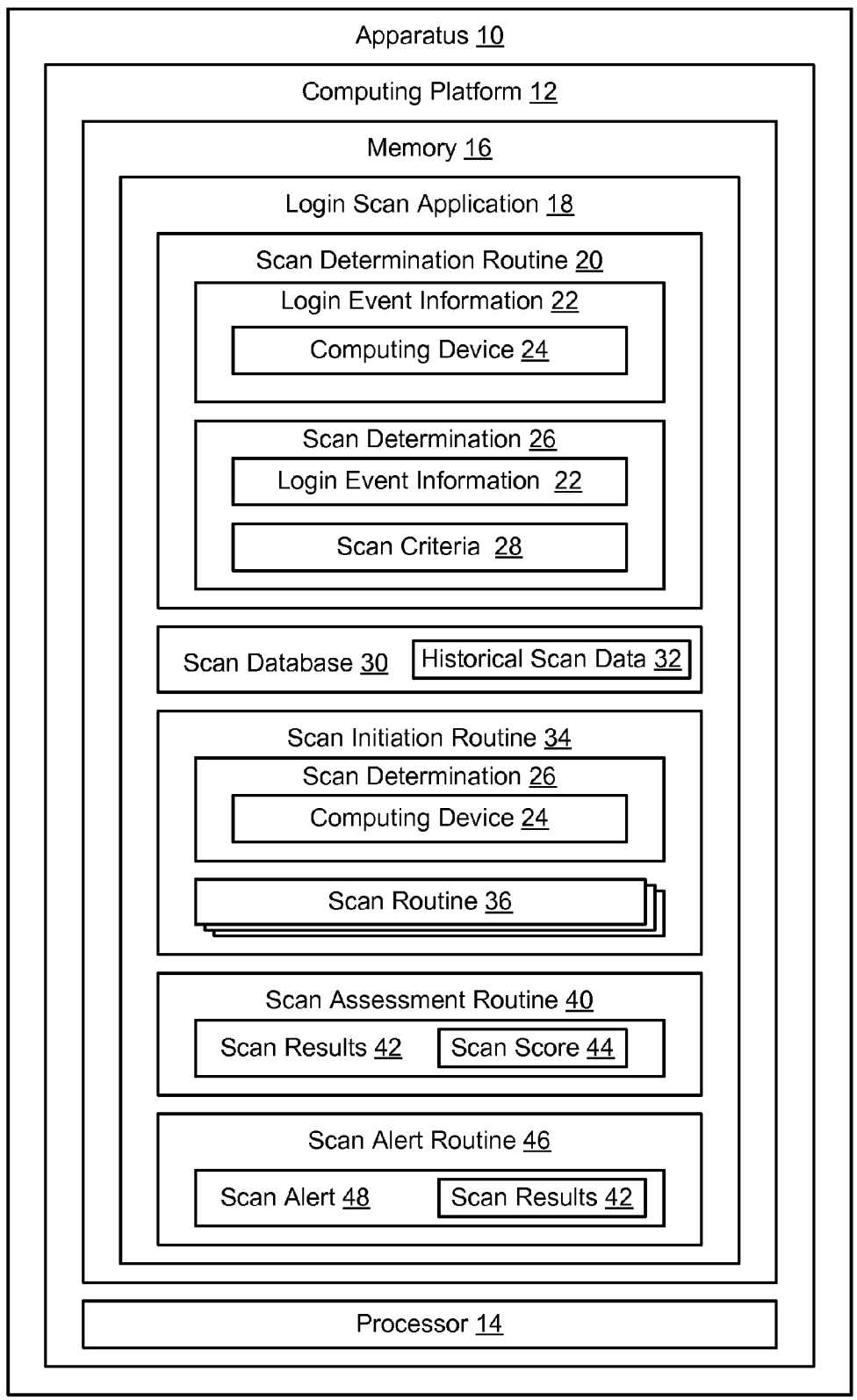
Figure 3:
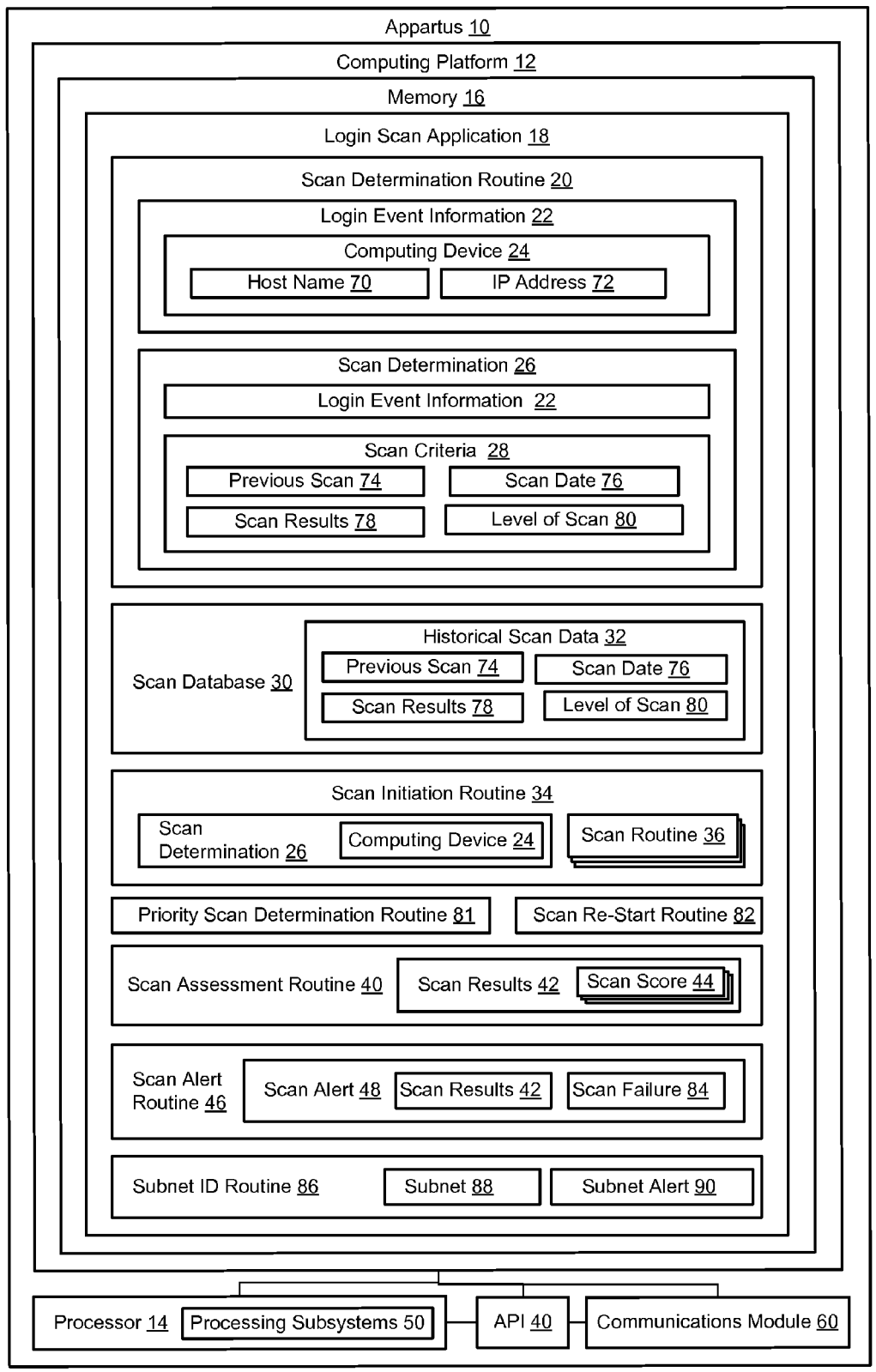
Figure 4:
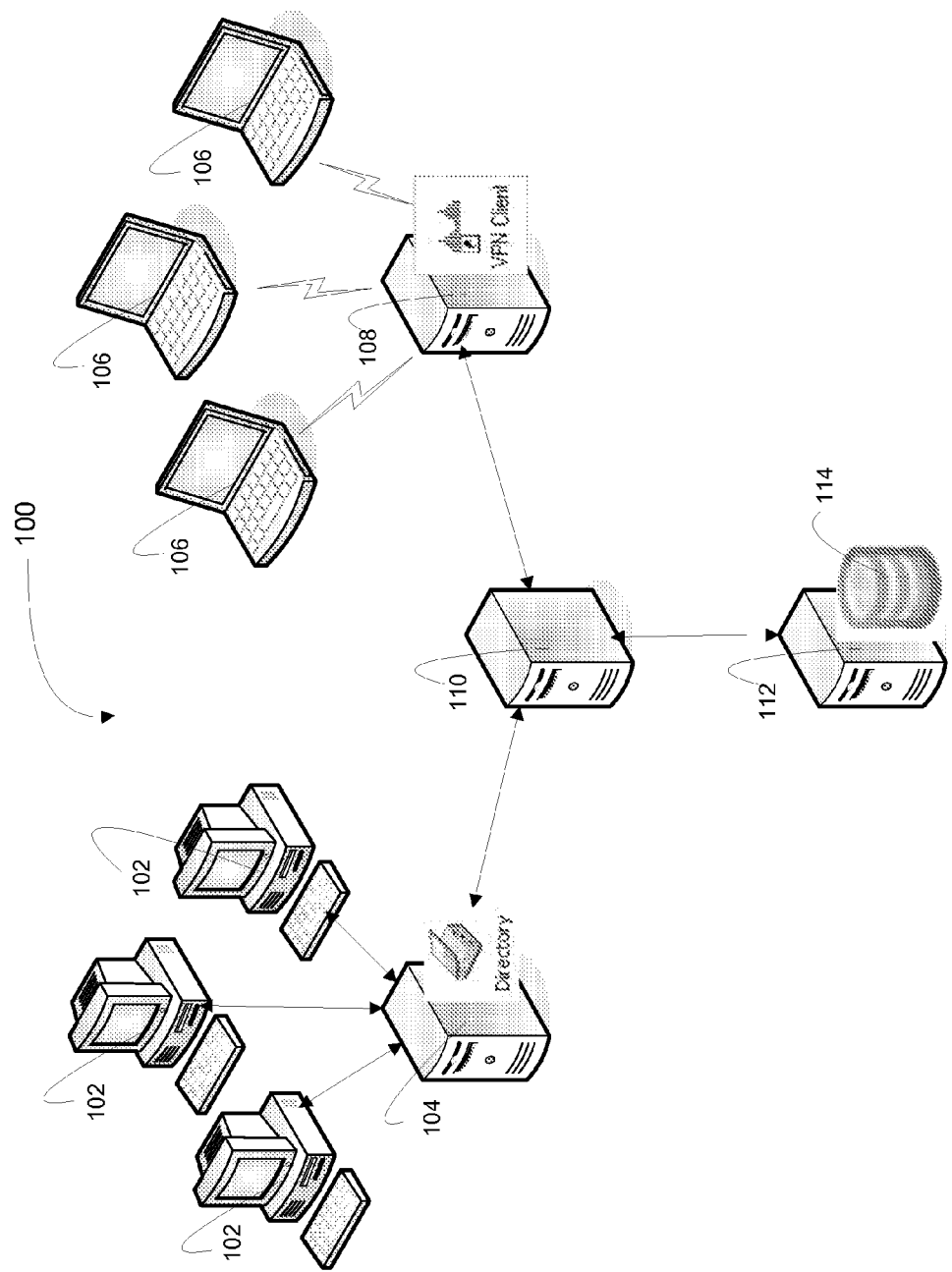
Figure 5:
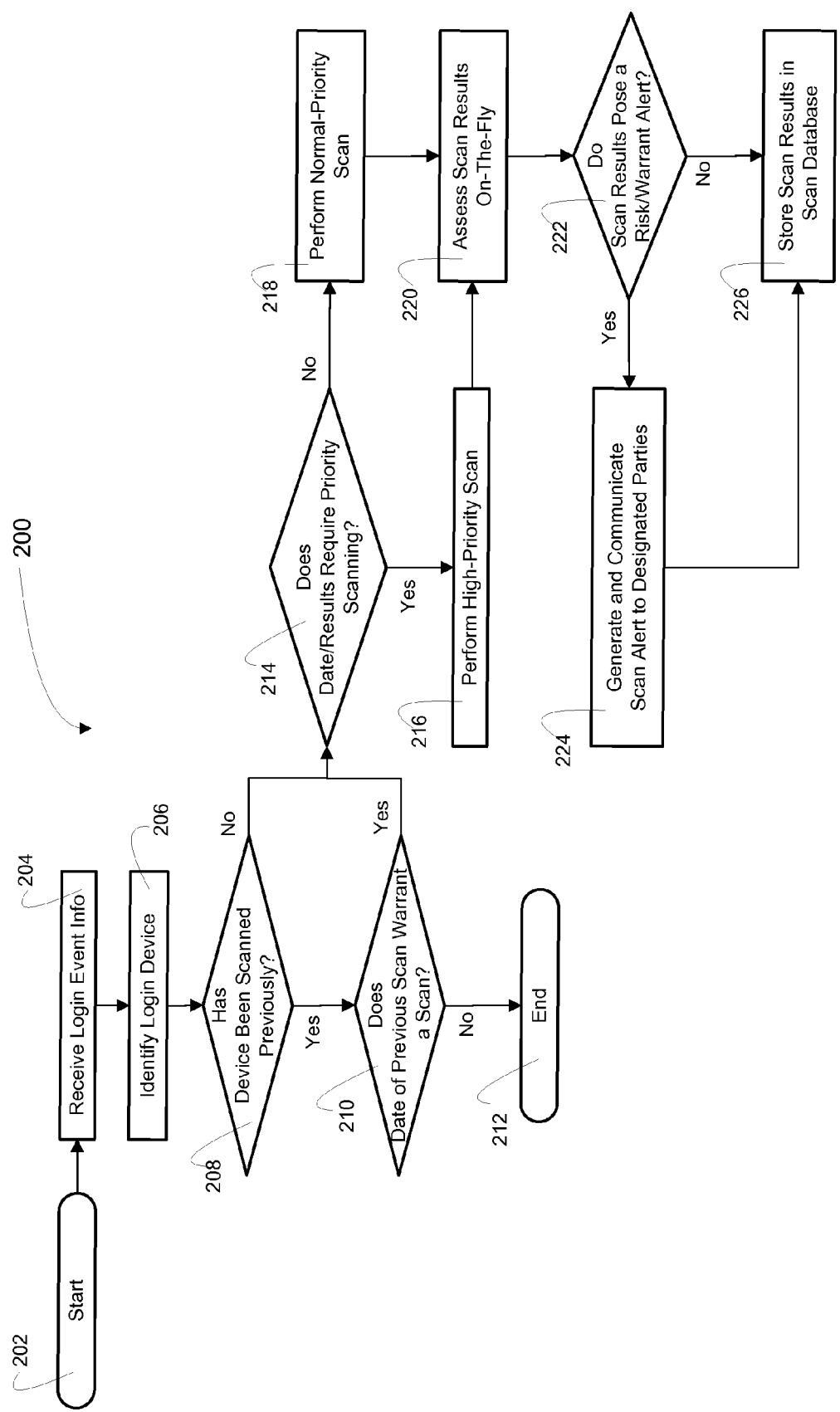
Figure 6:
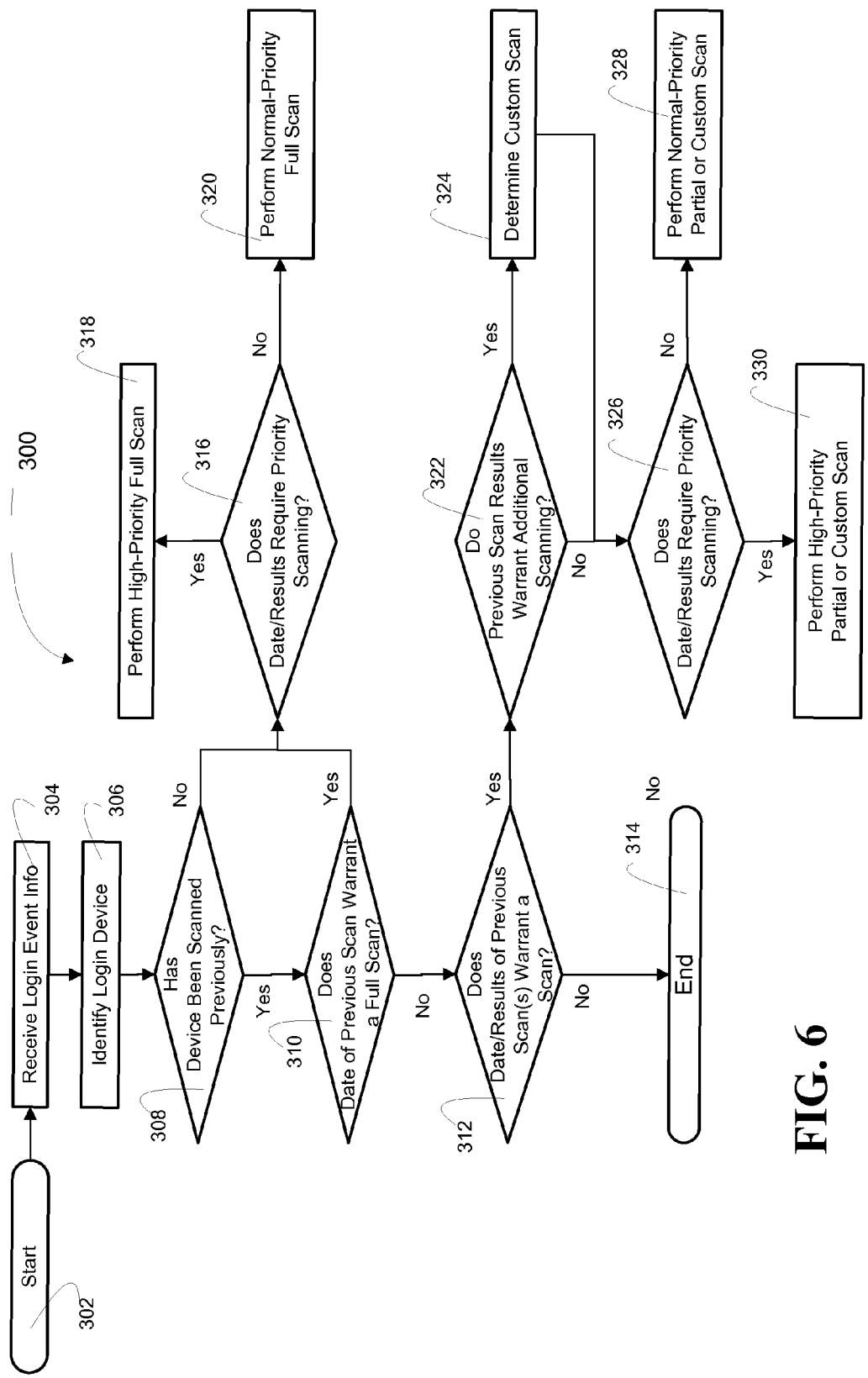
Figure 7:
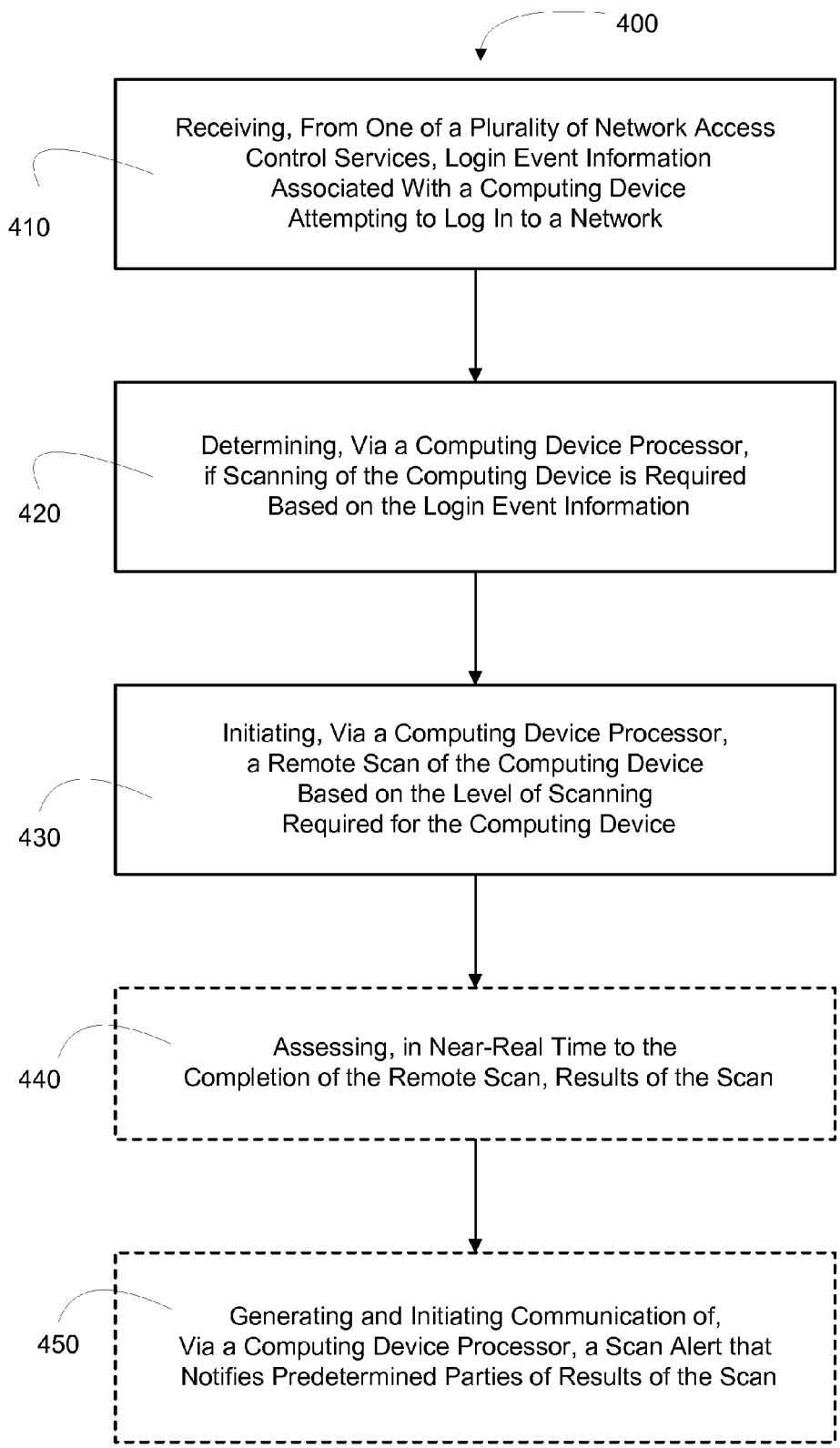

Having thus described embodiments of the invention in general terms, reference will now be made to the accompanying drawings, which are not necessarily drawn to scale, and wherein:

FIG. 1 is schematic diagram of an apparatus configured to provide login initiated scanning of computing devices, in accordance with embodiments of the present invention;

FIG. 2 is another schematic diagram of an apparatus configured to provide login initiated scanning of computing devices and scan result assessment in near-real-time with the completion of the scan, in accordance with embodiments of the present invention;

FIG. 3 is a schematic diagram of a more detailed apparatus configured to provide login initiated scanning of computing devices, in accordance with embodiments of the present invention;

FIG. 4 is a block diagram of a system for providing login initiated scanning of computing devices, in accordance with embodiments of the present invention;

FIG. 5 is a flow diagram of a method for providing login initiated scanning of computing devices and scan assessment, in accordance with embodiments of the present invention;

FIG. 6 is a flow diagram of a method for providing login initiated scanning of computing devices including level of scanning determination, in accordance with embodiments of the present invention; and FIG. 7 is a flow diagram of a method for providing login initiated scanning of computing devices, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block (s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention relate to systems, apparatus, methods, and computer program products for login initiated remote scanning of computer devices. The invention leverages information from any network access control service, such as Active Directory®, Virtual Private Network (VPN) or the like, to identify the computing device. Once identified, the system checks a scan database to determine if the device has been previously scanned and, if so, the date/time of the last-in-time scan. This information is used to determine if a scan should be performed and, in some embodiments, the level of scanning to be performed. In additional embodiments, the scan determination process may include a determination of the results of previous scans and performing the necessary level of scanning, including customized scanning, based on the previous results.

Additional embodiments of the invention provide for determining a priority for the scan based on date/time of the last-in-time scan and/or the previous scan results. Thus, if a device has not been scanned within a predetermined time period and/or if previous results place the device in a high-risk category, the device is be placed in a high priority queue, in which scanning occurs in the immediate future.

Additional embodiments of the invention provide for risk assessment to occur during the scan or in near-real time with the completion of the scan (i.e., on-the-fly). In specific embodiments the risk assessment may take the form of a risk score or the like. Such on-the-fly risk assessment allows for risk alerts to be sent to designated parties so as to instantaneously notify the party that a particular device has been found to be at high risk. On-the-fly scan assessments and instantaneous alert notification provide for corrective actions, such as limiting device functionality, disabling the device or the like, to occur proximate in time to the scan assessment, thereby limiting the risk to the enterprise.

Thus, apparatus, systems, methods and computer program products are herein disclosed that provide login initiated scanning of computing devices. FIG. 1 provides a high level schematic diagram of an apparatus 10 configured for login initiated scanning of computing devices, in accordance with embodiments of the present invention. The scanning that is performed on the computing device can be for any purpose required by the scan, network or security administrator. For example, scanning purpose may include, but is not limited to, risk/vulnerability assessment, capability assessment, usage assessment, and the like. Unlike other client-less scanning systems, which conduct enterprise-wide scanning on a regularly scheduled basis and, therefore, since offline devices are not scanned during regularly scheduled scans, provide for no guarantee that a device will be scanned, the present invention performs scans on computing devices in conjunction with the login procedure, thus, scanning is initiated when the system knows that that computing device is connected, or attempting to connect, to the network.

The apparatus 10 includes a computing platform 12 having at least one processor 14 and a memory 16. The memory 16 of apparatus 10 stores login scan application 18 that is configured to receive login event information, determine if scanning is required based on the login event information, historical scan data and preconfigured scan criteria and perform the scan as required, in accordance with embodiments of the present invention. Thus, login scan application 18 includes scan determination routine 20 that is configured to receive login event information 22 associated with a computing device 24 attempting to log into a network. According to specific embodiments of the invention the login information may be associated with a successful login event or unsuccessful login event. Thus, according to embodiments, scanning of the computing device may be initiated in the event the user of the device successfully logs in and scanning may also be initiated in the event the user of the device is unable to successfully login. The relevant login event information may include, but is not limited to, the Internet Protocol (IP) address of the computing device 24, the Media Access Control (MAC) address of the computing device 24, the host name of the computing device 24 and the like.

According to further specific embodiments of the invention, the login event information is received from one of a plurality of network access control services, for example, directory services, such as Active Directory® provided by the Microsoft Corporation of Redmond, Wash., Virtual Private Network (VPN) access or the like. Thus, the present invention leverages existing network access management systems, such that, the login scan application 18 can be configured to detect login and login attempts from any known, or future known, network access management system.

The scan determination routine 20 is additionally configured to provide for scan determination 26 (i.e., whether a scan is currently required) for the computing device 24 based on the login event information 22, predetermined scan criteria 28 and historical scan data 32 stored in scan database 30. In this regard, the scan determination routine may compare information in the login event information 22, such as host name, MAC address or IP address, to historical scan data 32 in a scan database 30. The historical scan data 32 provides, at a minimum, a listing of computing devices and the date(s) of the scan(s) performed. For purposes of the invention herein disclosed the term "date" may include a specific calendar date and/or a specific calendar date and time. Thus, the comparison of the login event information 22 to the historical scan data 32 results in a determination of whether the computing device 24 has been previously scanned and, if so the date(s) of the previous scan(s).

The scan criteria 28 defines the requirements for conducting a scan. In one embodiment of the invention the scan criteria 28 includes criteria for initiating the remote scan if a determination is made that the computing device has not previously been scanned. In other embodiments, the scan criteria 28 may include criteria for initiating the remote scan if a determination is made that the scan date of a last-in-time scan is outside of a predetermined scan period.

In further specific embodiments of the invention, the scan criteria 28 may include criteria associated with previous scan results. In such embodiments, the scan database 30 may additionally include scan results associated with previous scans. In specific embodiments of the invention, scan results may be associated with each individual prior scan and/or a group of previous scans (for example, the previous five scans) and/or all of the previous prior scans. For example, in one embodiment of the invention, scan results may include indication of a non-compliant or unacceptable result for a specific task within a previous scan. In another example, each scan may result in a scan score, which indicates a level of scan compliance or non-compliance and a group of previous scans or all of the previous scans may result in an overall scan score. Thus, the scan criteria 28 may dictate that additional or less scanning or more frequent or less frequent scanning be performed based on previous scan results. In specific embodiments, automatic dynamic customization of the scanning may be implemented to accommodate the previous scan results. Dynamic customization may include more frequent or less frequent scanning of the computing device, additional or less scanning than standard scan routine, such as configuration of additional or less scan tasks to meet the needs of the previous scan results.

Login scan application 20 additionally includes scan initiation routine 34 that is configured to initiate the scan of the computing device 24 based on the scan determination 26. The scan initiation routine 32 is configured to initiate one or more of the scan routines 36 based on the scan determination 26. Embodiments of the invention provide for the scan routines 36 to implement one or more scanning mechanisms. For example, port scanning, querying of public network interfaces or authenticated queries may be implemented to scan the devices. Port scanning is a method for obtaining an Operating System (OS) fingerprint of the device by generating a connection attempt on a set of pre-specified closed ports. Once the result of the sequence of connection attempts is received, it is compared to the database of known OS fingerprints, and additional rules may be applied to further refine OS determination and device information, such as performed by the Nmap Security Scanner, an open source application, written by Gordon Lyon. Unlike port knocking, which does not require user credentials to scan the device; authenticated queries require the scanning entity to have access to user login credentials (e.g., login name and password) in order to scan the device.

In addition, according to specific embodiments, the scan initiation routine 34 is configured to engage third-party scanning entities to perform the scan on the computing device 24. For example, third-party scanning entities, such as Foundstone® a division of McAfee Corporation, of Mission Viejo, Calif., may be engaged to perform vulnerability scans or the like.

Referring to FIG. 2 an alternate embodiment of the invention is depicted, in which, apparatus 10 is configured for on-the-fly scan assessment in accordance with additional embodiments of the invention. In such embodiments, the login scan application 18 includes scan assessment routine 40 that is configured to assess scan results 42 in near-real time to the completion of the scan. In this regard, scan results 42 may be assessed concurrent with the scan in order to provide for the scan results in near-real time to the completion of the scan. The scan results 42 may identify non-compliance, and, for risk-type scan assessments may include, but not limited to, absence of a critical service, disablement of a critical service, open share files, out-of-date antivirus files and the like. In specific embodiments, the scan results 42 may take the form of one or more scan scores 44. The scan scores may include an individual scan score for the just completed scan, an overall scan score for all of the previous scans, a group scan score for a group of previous scans (e.g., the last five previous scans or the like) or the like.

In traditional scanning systems, scan results and, specifically scan scoring is performed significantly after the scanning process. For example, client-based scans may be reported to a system on an ad hoc basis and the scan results and/or scan scores are determined on a regularly scheduled basis. In another example, conventional client-less scans are performed in unison across an enterprise on a regularly scheduled basis and the results and/or scoring are determined once all of the computing devices return their respective scan outputs, typically, in such systems a lengthy period may ensue prior to knowing the results of the scans. In present embodiments of the invention, the near-real time assessment of scan results 42 and/or scan scores 44 provide for a scan alert 48 to be immediately generated and communicated to predetermined parties to notify the parties of the scan results so that appropriate actions can be taken be mitigate the risk posed by the scanned device.

Thus, according to specific embodiments, login scan application 18 additionally includes scan alert routine 46 configured to generate and initiate communication of a scan alert 48 to one or more designated parties based on the scan results. Thus, the scan alert routine 46 may be configured to generate scan alerts 48 based on scan results that show the occurrence of predetermined non-compliances and/or compliances or predetermined scan scores below or above predetermined scan score limits. Thus, scan alerts 48 may be generated based on both negative and positive scan results. The scan administrator may designate the parties to whom the scan alert 48 may be communicated to and either the scan administrator or the designated parties may configure the alert to be communicated by one or more chosen communication means, such as email, Web Service call, Short Message Service (SMS)/text, voice mail and/or the like.

Referring to FIG. 3, shown is a more detailed block diagram of apparatus 10, according to embodiments of the present invention. The apparatus 10 is configured to provide login initiated scanning of computing devices. In addition to providing greater detail, FIG. 3 highlights various alternate embodiments of the invention. The apparatus 10 may include one or more of any type of computing device. The present apparatus and methods can accordingly be performed on any form of one or more computing devices.

The apparatus 10 includes computing platform 12 that can receive and execute algorithms, such as routines, and applications. Computing platform 12 includes memory 16, which may comprise volatile and non-volatile memory, such as read-only and/or random-access memory (RAM and ROM), EPROM, EEPROM, flash cards, or any memory common to computer platforms. Further, memory 16 may include one or more flash memory cells, or may be any secondary or tertiary storage device, such as magnetic media, optical media, tape, or soft or hard disk.

Further, computing platform 12 also includes processor 14, which may be an application-specific integrated circuit ("ASIC"), or other chipset, processor, logic circuit, or other data processing device. Processor 14 or other processor such as ASIC may execute an application programming interface ("API") 40 that interfaces with any resident programs, such as login scan application 18 and algorithms associated therewith or the like stored in the memory 16 of the apparatus 10.

Processor 14 includes various processing subsystems 50 embodied in hardware, firmware, software, and combinations thereof, that enable the functionality of apparatus 10 and the operability of the apparatus on a network. For example, processing subsystems 50 allow for initiating and maintaining communications and exchanging data with other networked devices. For the disclosed aspects, processing subsystems 50 of processor 14 may include any subsystem used in conjunction with login scan application 18 and related algorithms, sub-algorithms, sub-modules thereof.

Computer platform 12 additionally includes communications module 60 embodied in hardware, firmware, software, and combinations thereof, that enables communications among the various components of the apparatus 10, as well as between the other networked devices. Thus, communication module 70 may include the requisite hardware, firmware, software and/or combinations thereof for establishing a network communication connection and communicating scan alerts 48 or reports including scan results to designated entities.

As previously noted, the memory 16 of apparatus 10 stores login scan application 18 that is configured to receive login event information 22, determine if scanning is required based on the login event information 22, historical scan data 32 and preconfigured scan criteria 28 and perform the scan as required, in accordance with embodiments of the present invention. Thus, login scan application 18 includes scan determination routine 20 that is configured to receive login event information 22 associated with a computing device 24 attempting to log into a network. The relevant login event information may include, but is not limited to, the Internet Protocol (IP) address 72 of the computing device 24, the host name 70 of the computing device 24 and the like.

The scan determination routine 20 is additionally configured to provide for scan determination 26 (i.e., whether a scan is currently required) for the computing device 24 based on the login event information 22, predetermined scan criteria 28 and historical scan data 32 stored in scan database 30. In this regard, the scan determination routine may compare information in the login event information 22, such as host name 70 or IP address 72, to historical scan data 32 in a scan database 30. The historical scan data 32 provides, at a minimum, a listing of previous scans 74 and the scan date(s) 76. In alternate embodiments, the historical scan data also includes scan results 78 associated with the prior scan and the level of the scan 80.

In one embodiment of the invention the scan criteria 28 includes previous scan criteria 74 for initiating the remote scan if a determination is made that the computing device has not previously been scanned. In other embodiments, the scan criteria 28 may include scan date criteria 76 for initiating the remote scan if a determination is made that the scan date of a last-in-time scan is outside of a predetermined scan period. In further specific embodiments of the invention, the scan criteria 28 may include scan results criteria associated with previous scan results. In such embodiments, the scan database 30 may additionally include scan results 78 associated with previous scans.

In specific embodiments of the invention, scan results 78 may be associated with each individual prior scan and/or a group of previous scans (for example, the previous five scans) and/or all of the previous prior scans. For example, in one embodiment of the invention, scan results may include indication of a non-compliant or unacceptable result for a specific task within a previous scan. In another example, each scan may result in a scan score, which indicates a level of scan compliance or non-compliance and a group of previous scans or all of the previous scans may result in an overall scan score. Thus, the scan criteria 28 may dictate that additional or less scanning or more frequent or less frequent scanning be performed based on previous scan results. In specific embodiments, automatic dynamic customization of the scanning may be implemented to accommodate the previous scan results. Dynamic customization may include more frequent or less frequent scanning of the computing device, additional or less scanning than standard scan routine, such as configuration of additional or less scan tasks to meet the needs of the previous scan results.

According to other specific embodiments, the scan criteria may include the level of scan 80 required based on scan dates 76 and level of previous scans 80 of the computing device. For example, if the computing device 24 is determined to have not been scanned in the past, the scan criteria 28 may mandate that a full scan of the device is typically required. A full scan is defined as a deep-level scan of most, if not all, of the compliance and risk characteristics associated with the device. If the computing device has been scanned in the past, then the scan criteria 28 may define the level of scanning that currently needs to be performed based on the dates and level of previous scans of the computing device. For example, the scan criteria 28 may define that a full scan needs to performed once every seven days, once every fourteen days, once every thirty day or the like and that a partial or quick scan needs be performed once every day, once every other day, once every seven days or the like. The partial or quick scan may be configured by the scanning entity to be any portion or subset of the full scan.

Thus, for example, if the comparison of the login event information 22 to the historical scan data 32 determines that a full scan has not been performed within the past ten days and the scan criteria 28 requires a full scan once every seven days, a full scan will be initiated based on the login event. In another example, if the comparison of the login event information 22 to the historical scan data 32 determines that a full scan has been performed in the past seven days and that a partial or quick scan has not been performed in the past day and the search scan 28 requires a full scan once every seven days and a partial scan once every day, a partial scan will be initiated based on the login event. In yet another example, if the comparison of the login event information 22 to the historical scan data 32 determines that a full scan has been performed in the past seven days and that a partial or quick scan has been performed in the past day and the scan criteria 28 requires a full scan once every seven days and a partial scan once every day, no scan will be initiated based on the login event. Thus, for the purposes of the invention herein disclosed and claimed "level of scan" may include, but is not limited to, full scan, partial scan and/or no scan.

Login scan application 20 additionally includes scan initiation routine 34 that is configured to initiate the scan of the computing device 24 based on the scan determination 26. The scan initiation routine 32 is configured to initiate one or more of the scan routines 36 based on the scan determination 26. Additionally, login scan application 18 may optionally include scan re-start routine 82 that is configured to re-start a scan, from the point at which the scan was interrupted, in the event that the scan fails to complete.

The login scan application 18 may include scan assessment routine 40 that is configured to assess scan results 42 in near-real time to the completion of the scan. In this regard, scan results 42 may be assessed concurrent with the scan in order to provide for the scan results in near-real time to the completion of the scan. The scan results 42 may identify non-compliance, and, for risk-type scan assessments may include, but not limited to, absence of a critical service, disablement of a critical service, open share files, out-of-date antivirus files and the like. In specific embodiments, the scan results 42 may take the form of one or more scan scores 44. The scan scores may include an individual scan score for the just completed scan, an overall scan score for all of the previous scans, a group scan score for a group of previous scans (e.g., the last five previous scans or the like) or the like.

According to further specific embodiments, login scan application 18 additionally includes scan alert routine 46 configured to generate and initiate communication of a scan alert 48 to one or more designated parties based on the scan results. Thus, the scan alert routine 46 may be configured to generate scan alerts 48 based on scan results that show the occurrence of predetermined non-compliances and/or compliances or predetermined scan scores below or above predetermined scan score limits. Thus, scan alerts 48 may be generated based on both negative and positive scan results. In addition, scan alert routine 46 may be configured to generate and communicate scan alerts that notify designated parties of a scan failure 84 in the event that a scan does not complete and the re-start routine 82 was unable to rectify the problem.

The login scan application 18 may additionally include subnet identification routine 86 that is configured to identify subnets based on login event information 22. The login initiated scanning procedures herein disclosed are not limited to the devices residing within predefined network coverage maps. The login initiated scanning of the present invention includes the ability to detect any device logging into the network and, thus provides the additional benefit of identifying network coverage gaps, referred to herein as subnets by comparing IP addresses 72 in the login event information 22 with the existing map to determine if the IP address 72 falls within a known subnet. If the IP address does not fall within a known sub-network, a new sub-network is identified and a subnet alert 90 may be generated and communicated to designated parties.

Referring to FIG. 5 a flow diagram is depicted of a method 200 for login initiated scanning of computing devices and on-the-fly scan assessment, in accordance with embodiments of the present invention. The method begins at Start Event 202 and at Event 204 login event information is received. As previously noted, the login event may correspond with a successful login or an unsuccessful login. At Event 206 an attempt is made to identify the computing device by comparing the login event information, specifically the host name, MAC address and/or IP address to information in scan database.

At Decision 208, a determination is made as to whether the computing device has been scanned previously. This determination is made by comparing the host name, included in the login event information, to the scan database. If the determination is made that the computing has previously been scanned at Decision 210, a determination is made as to whether the date of the previous scan warrants a current scan. Scan criteria, preconfigured by the scanning party administrator or the like, will define the required scan period, i.e., the period of time in which a scan is required to be performed. The determination is made by comparing the scan criteria to the scan database to determine if the last-in-time scan was performed with the required scan period. If the determination is made that the last-in-time scan was performed within the required scan period, at Event 212, the method ends with no scan being performed.

If the determination is made that that the computing device has not been previously scanned or the determination is made that last-in-time scan was performed outside of the required scan period, at Decision 214, a determination is made as to whether the date and/or results of previous scans warrant priority scanning. If the results of previous scans indicate that the device is a high-risk or the previous scan date is beyond a predetermined priority threshold, at Event 216 a high-priority scan of the computing device is performed. The high-priority scan dictates that the scan be placed in a high-priority queue that provides for the scan to be initiated when the next scanning thread becomes available. If the results of previous scans or the previous scan date do not warrant priority scanning, at Event 218 a normal-priority scan of the computing device is scheduled. The normal-priority scan dictates that the scan be placed in a normal-priority queue that provides for the scan to be initiated based on first in-first out principles.

At Event 220, on-the-fly scan results are assessed. The scan results may be assessed concurrently with the scan operation and/or proximate to the completion of the scan, so that the scan assessment is accomplished in near-real-time to the completion of the scan process. At Decision 222, a determination is made as to whether the scan results pose a high risk threat or warrant a scan alert. The high-risk threat or warranting of a scan alert may be dictated by a scan score or overall scan score above a predetermined threshold or the determination of the occurrence of one or more predetermined high-risk non-compliances identified during the scan. If the scan results pose a high-risk and/or the scan results warrant a scan alert, at Event 224, a scan alert is automatically generated and communicated to designated parties. Once the alert is generated and communicated, at Event 226, the scan results are stored in the scan database. If the scan results do not pose the necessary high-risk or otherwise do not warrant a scan alert, at Event 226, the scan results are stored in the scan database.

Thus, present embodiments herein disclosed provide for login initiated remote scanning of computer devices. The present invention detects login, or login attempts, to the network via existing access management systems. The login data provides information that identifies the device so that the device can be checked against a scan database to determine if and when the previous scan occurred. Based on the findings in the scan database determinations are made to perform full scans, partial/quick scans or no scan at all. Additionally, the level of scanning can be based on previous scan results, which may dictate customized scanning. In addition, dates of last-in-time scans and/or scan results may dictate the priority of the impending scan. Further embodiments provide for assessing risk, such as risk scoring or the like, concurrently or in near-real-time with the completion of the scan so that alerts may be communicated to notify designated parties for the purpose of instituting corrective actions, such as disabling applications or devices, proximate in time to the scan process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for scanning a computing device, the method comprising:

receiving, from one of a plurality of network access control services, login event information associated with a computing device attempting to log in to a network, wherein the login event information includes one or more of an Internet Protocol (IP) address, a Media Access Control (MAC) address or a host name, associated with the computing device attempting to log in to the network;

determining, via a computing device processor, that scanning of the computing device is required by (1) determining that at least one of the IP address, the MAC address or the host name is not included in a list of previously scanned computing devices, wherein the list identifies the previously scanned computing devices by at least one of IP addresses, MAC addresses or host names and, if the at least one of the IP address, the MAC address or the host name is included in the list, (2) determining that a last-in-time scan of the computing device occurred outside of a predetermined scan period of time;

determining, via computing device processor, that scanning of the computing device requires priority scanning based on either (1) previous scan results indicating non-compliance or (2) the last-in-time scan of the computing device occurring outside a predetermined priority period of time;

in response to determining that scanning of the computing device requires priority scanning, placing the computing device in a high-priority scanning queue that is configured to scan the computing device when a next-in-time scanning thread becomes available; and in response to the next-in-time scanning thread becoming available, initiating, via a computing device processor, a remote scan of the computing device based on the determination that the computing device requires scanning.

2. The method of claim 1, further comprising assessing, in near-real time to the completion of the remote scan, results of the scan.

3. The method of claim 2, wherein assessing further comprises determining, via a computing device processor, at least one scan score for the computing device based at least in part on the results of the scan.

4. The method of claim 2, further comprising generating and initiating communication of, via computing device processor, a scan alert that notifies predetermined parties of the results of the scan.

5. The method of claim 1, wherein receiving further comprises receiving, from the one of a plurality of network access control services, the login event information, wherein the login event is one of a successful login event or a failed login event.

6. The method of claim 1, wherein determining further comprises determining a level of scanning required for the computing device based on the login information.

7. The method of claim 1, wherein determining further comprises determining, via the computing device processor, results of one or more previous scans of the computing device and wherein initiating further comprises initiating, via the computing device, a customized remote scan based on the results of the one or more previous scans of the computing device.

8. The method of claim 1, wherein initiating further comprises initiating, via the computing device, the remote scan, wherein the remote scan performs checks based on one of port scanning, public network interfaces or authenticated queries.

9. The method of claim 1, wherein initiating further comprises engaging a third party scanning entity to perform at least a portion of the remote scan.

10. The method of claim 1, further comprising identifying, via a computing device processor, a previously unidentified subnet within the network based on the Internet Protocol (IP) address being included in the login event information.

11. The method of claim 10, further comprising generating and initiating communication of, via a computing device processor, a subnet alert that notifies predetermined parties of the subnet.

12. An apparatus for scanning a computing device, the apparatus comprising:

a computing platform including a memory and at least one processor;

a scan database stored in the memory, accessible via the processor and configured to store a historical scan data; and a login scan application stored in the memory, executable by the processor and including, a scan determination routine configured to:

receive, from one of a plurality of network access control services, login event information associated with a computing device attempting to log in to a network, wherein the login event information includes one or more of an Internet Protocol (IP) address, a Media Access Control (MAC) address or a host name, associated with the computing device attempting to log in to the network, determine that scanning of the computing device is required based on the login event information by (1) determining that at least one of the IP address, the MAC address or the host name is not included in the historical scan data, wherein the historical scan data identifies the previously scanned computing devices by at least one of IP addresses, MAC addresses or host names and, if the at least one of the IP address, the MAC address or the host name is included in the historical scan data, (2) determining that a last-in-time scan of the computing device occurred outside of a predetermined scan period of time, and determine that scanning of the computing device requires priority scanning based on either (1) previous scan results indicating non-compliance or (2) the last-in-time scan of the computing device occurring outside a predetermined priority period of time, in response to determining that scanning of the computing device requires priority scanning, placing the computing device in a high-priority scanning queue that is configured to scan the computing device when a next-in-time scanning thread becomes available, and a scan initiation routine configured to, in response to the next-in-time scanning thread becoming available, initiate a remote scan of the computing device based on the determination that the computing device requires scanning.

13. The apparatus of claim 12, wherein the scan application further comprises a scan assessment routine configured to assess, in near-real time to the completion of the remote scan, scan results of the remote scan.

14. The apparatus of claim 13, wherein the scan assessment routine is further configured to determine at least one scan score for the computing device based at least in part on the scan results of the remote scan.

15. The apparatus of claim 13, wherein the scan application further comprises a scan alert routine configured to generate and initiate communication of a scan alert that notifies predetermined parties of the scan results.

16. The apparatus of claim 12, wherein the scan determination routine is further configured to receive, from the one of a plurality of network access control services, the login event information, wherein the login event is one of a successful login event or a failed login event.

17. The apparatus of claim 12, wherein the scan determination routine is further configured to determine a level of scanning required for the computing device based on the login information, the historical scan data and predetermined scan criteria.

18. The apparatus of claim 17, wherein the scan criteria includes criteria associated with scan results and the scan determination routine is further configured to determine the level of scanning required for the computing device based on the login information, the historical scan data and predetermined scan criteria associated with the scan results.

19. The apparatus of claim 12, wherein the scan initiation routine is further configured to initiate the remote scan, wherein the remote scan performs checks based on one of port scanning, public network interfaces or authenticated queries.

20. The apparatus of claim 12, wherein the scan initiation routine is further configured to engage a third party scanning entity to perform at least a portion of the remote scan.

21. The apparatus of claim 12, further comprising a security event management application configured to identify a previously unidentified subnet within the network based on the Internet Protocol (IP) address being included in the login event information.

22. The apparatus of claim 21, further comprising a subnet alert application stored in the memory, executable by the processor and configured to generate and initiate communication of a sub-net alert that notifies predetermined parties of the subnet.

23. A computer program product comprising:
a non-transitory computer-readable medium comprising:
a first set of codes for causing a computer to receive, from one of a plurality of network access control services, login event information associated with a computing device attempting to log in to a network, wherein the login event information includes one or more of an Internet Protocol (IP) address, a Media Access Control (MAC) address or a host name, associated with the computing device attempting to log in to the network;
a second set of codes for causing a computer to determine that scanning of the computing device is required by (1) determining that at least one of the IP address, the MAC address or the host name is not included in a list of previously scanned computing devices, wherein the list identifies the previously scanned computing devices by at least one of IP addresses, MAC addresses or host names and, if the at least one of the IP address, the MAC address or the host name is included in the list, (2) determining that a last-in-time scan of the computing device occurred outside of a predetermined scan period of time;
a third set of codes for causing a computer to determine that scanning of the computing device requires priority scanning based on either (1) previous scan results indicating non-compliance or (2) the last-in-time scan of the computing device occurring outside a predetermined priority period of time;
a fourth set of codes that cause a computer to, in response to determining that scanning of the computing device requires priority scanning, place the computing device in a high-priority scanning queue that is configured to scan the computing device when a next-in-time scanning thread becomes available; and
a fifth set of codes for causing a computer to, in response to the next-in-time scanning thread becoming available, initiate a remote scan of the computing device based on the determination that the computing device requires scanning.

24. The computer program product of claim 23, further comprising a sixth set of codes configured to cause a computer to assess, in near-real time to the completion of the remote scan, results of the scan.

25. The computer program product of claim 24, wherein the sixth set of codes is further configured to cause the computer to determine at least one scan score for the computing device based at least in part on the results of the scan.

26. The computer program product of claim 24, further comprising a seventh set of codes for causing the computer to generate and initiate communication of a scan alert that notifies predetermined parties of the results of the scan.

27. The computer program product of claim 24, wherein the first set of codes is further configured to cause the computer to receive, from the one of a plurality of network access control services, the login event information, wherein the login event is one of a successful login event or a failed login event.

28. The computer program product of claim 23, wherein the second set of codes is further configured to cause the computer to determine a level of scanning required for the computing device based on the login information.

29. The computer program product of claim 23, further comprising a sixth set of codes for causing a computer to identify a previously unidentified subnet within the network based on an Internet Protocol (IP) address being included in the login event information and a fifth set of codes for causing a computer to generate and initiate communication of a sub-net alert that notifies predetermined parties of the subnet.

* * * * *